(12) United States Patent
Bao et al.

(10) Patent No.: US 11,427,271 B2
(45) Date of Patent: Aug. 30, 2022

(54) SUSPENSION SYSTEM WITH DAMPING AND BUFFERING PROPERTY AND TRACK-TYPE MOBILE PLATFORM

(71) Applicants: Shandong Guoxing Intelligent Technology Co., Ltd., Yantai (CN); Shandong Atu Robot Technology Co., Ltd., Yantai (CN)

(72) Inventors: Terry Bao, Yantai (CN); Tingting Guo, Yantai (CN); Hongxiu Sun, Yantai (CN)

( * ) Notice: Subject to any disclaimer, the term of this patent is extended or adjusted under 35 U.S.C. 154(b) by 0 days.

(21) Appl. No.: 17/508,924

(22) Filed: Oct. 22, 2021

(65) Prior Publication Data

US 2022/0041229 A1 Feb. 10, 2022

Related U.S. Application Data

(63) Continuation of application No. PCT/CN2020/096655, filed on Jun. 17, 2020.

(30) Foreign Application Priority Data

May 8, 2020 (CN) .......................... 202010380265.4

(51) Int. Cl.
*B62D 55/108* (2006.01)
(52) U.S. Cl.
CPC .................................. *B62D 55/108* (2013.01)
(58) Field of Classification Search
CPC combination set(s) only.
See application file for complete search history.

(56) References Cited

U.S. PATENT DOCUMENTS 1,393,157 A * 10/1921 Ollivier ................ B62D 55/112
305/133
1,836,446 A * 12/1931 Christie ............... B62D 55/108
180/9.1
(Continued)

FOREIGN PATENT DOCUMENTS

CN 206528540 U 9/2017
CN 107878584 * 4/2018 ............ B62J 11/002
(Continued)

OTHER PUBLICATIONS

Internation Search Report of PCT/CN2020/096655, dated Feb. 20, 2021.

*Primary Examiner* — Tony H Winner
*Assistant Examiner* — Harold Eric Pahlck, III

(57) ABSTRACT

The present disclosure provides a suspension system with damping and buffering properties, comprising a suspension assembly, a wheel train assembly and a track assembly, the suspension assembly comprises a suspension lateral plate, an approach plate, a first elastic element, a tensioning assembly, a second elastic element, an oscillating arm plate and a damping element; the wheel train assembly comprises a first approach wheel, a second approach wheel, a first load-bearing wheel, a second load-bearing wheel, a track supporting wheel and an actuation wheel. A high stability of a mobile platform moving through obstacles can be realized by assembling the approach plate, the first elastic plate and the damping element into a loading and shock absorbing module in the present disclosure.

7 Claims, 6 Drawing Sheets

(56) References Cited

U.S. PATENT DOCUMENTS

| | | | | |
|---|---|---|---|---|
| 2,779,636 A * | 1/1957 | Allen | ............... | B62D 55/1083 |
| | | | | 305/133 |
| 2,860,715 A * | 11/1958 | Bouffort | ............. | B62D 55/116 |
| | | | | 180/9.1 |
| 2,967,075 A * | 1/1961 | Christie | ............. | B62D 49/0621 |
| | | | | 301/1 |
| 3,343,619 A | 9/1967 | Johansson | | |
| 4,454,925 A * | 6/1984 | Oswald | ............... | B62D 61/10 |
| | | | | 180/22 |
| 4,809,803 A * | 3/1989 | Ahern | ............... | B62D 55/104 |
| | | | | 280/771 |
| 4,850,786 A * | 7/1989 | Oswald | ............... | B66C 19/007 |
| | | | | 294/81.2 |
| 4,898,257 A | 2/1990 | Brandstadter | | |
| 5,988,775 A * | 11/1999 | Nordberg | ............. | B62D 55/305 |
| | | | | 305/153 |
| 7,131,507 B2 * | 11/2006 | Wenger | ............... | B62D 55/108 |
| | | | | 180/6.7 |
| 8,844,665 B2 * | 9/2014 | Wenger | ............... | B62D 5/075 |
| | | | | 180/9.1 |
| 8,875,816 B2 * | 11/2014 | Steltz | ............... | B62D 55/244 |
| | | | | 180/6.54 |
| 2015/0166133 A1 * | 6/2015 | Eavenson, Sr. | ...... | B62D 55/108 |
| | | | | 305/134 |
| 2016/0368549 A1 * | 12/2016 | Davis | ............... | B62D 55/30 |
| 2018/0162465 A1 * | 6/2018 | Visscher | ............... | B62D 55/06 |

FOREIGN PATENT DOCUMENTS

| | | | | |
|---|---|---|---|---|
| CN | 107878584 A | | 4/2018 | |
| CN | 108974163 A | | 12/2018 | |
| CN | 109050695 A | | 12/2018 | |
| CN | 109303994 | * | 2/2019 | ............ A62C 27/00 |
| CN | 109303994 A | | 2/2019 | |
| CN | 110180113 A | | 8/2019 | |
| CN | 305586083 S | | 2/2020 | |
| DE | 1091905 B | | 10/1960 | |
| WO | 2014008370 A1 | | 1/2014 | |

\* cited by examiner

SUSPENSION SYSTEM WITH DAMPING AND BUFFERING PROPERTY AND TRACK-TYPE MOBILE PLATFORM

CROSS-REFERENCE TO RELATED APPLICATIONS

This application is a continuation of International Application No. PCT/CN2020/096655 with a filling date of Jun. 17, 2020, designating the United States, now pending, and further claims to the benefit of priority from Chinese Application No. 202010380265.4 with a filing date of May 8, 2020. The content of the aforementioned applications, including any intervening amendments thereto, are incorporated herein by reference.

TECHNICAL FIELD

The present disclosure relates to the technical field of track-type robots, and specifically relates to a suspension system with damping and buffering property and track-type mobile platform adopting the suspension system.

BACKGROUND

Since the successful application of track chassis mechanism on tanks at the beginning of 20th century, a large number of modified products that can be used in special robot development such as patrol inspection and exploration, rescue and anti-explosion, special photography and special transportation occur in track mobile chassis along with the technology development, which brings new research spots in the fields of national fire-fighting, police and public safety, and patrol inspection etc. The track-type mobile chassis possesses advantages such as flexible action, big contacting area with ground and strong ability of moving through obstacles.

The suspension assembly in the prior track-type mobile chassis generally realizes the shock absorbing effect by directly configuring multiple supporting arm or torsion bar structures slantways between the approach wheel and the departure wheel, configuring a load-bearing wheel on the lower end of the supporting arm or torsion bar and configuring a separate elastic element on the upper end thereof. An example is the shock absorbing walking mechanism of fire-fighting robots disclosed in a patent whose application number is 201910542914.3.

In the designing solution of the above prior suspension assembly, the first supporting arm or torsion bar in the front end will be greatly deformed due to outside impact when the track-type chassis moves through obstacles, which will influence the stability of chassis and further directly influence the stable operation and reliable work of equipment mounted on the chassis; the vehicle body will strike forward at the moment that the track-type mobile chassis moves over obstacle in high height and topples over, resulting in an overload of impact load on the front end of the suspension system and causing damages ranging from suspension system breaking down to electric elements inside the equipment being destroyed, which will end up in equipment failure and even triggering equipment accidents such as fire and explosion.

SUMMARY OF THE INVENTION

In light of the above technical problems, the present disclosure provides a suspension system with damping and buffering property and a track-type mobile platform using the suspension system.

The technical solution used in the present disclosure is as follows:

a suspension system with damping and buffering property, comprising a suspension assembly, a wheel train assembly and a track assembly, wherein, the suspension assembly comprises a suspension lateral plate, an approach plate, a first elastic element, a second elastic element, an oscillating arm plate and a damping element; the wheel train assembly comprise a first approach wheel, a second approach wheel, a first load-bearing wheel, a second load-bearing wheel, a track supporting wheel and an actuation wheel; the track assembly is wrapped on a circular contour formed by the wheel train assembly;

the suspension lateral plate is configured vertically and mounted to a vehicle body; the approach plate is in a triangle shape, its upper top is rotationally connected to a front end of the suspension lateral plate, its left top is configured with the first approach wheel, and its right top is configured with the first load-bearing wheel; the first elastic element and the damping element are configured between the approach plate and the suspension lateral plate and are arranged parallelly;

the oscillating arm plate is arranged slantwise, its top is hinged to the suspension lateral plate, and its bottom is connected to the second load-bearing wheel; the top of the second elastic element is connected to the suspension lateral plate and the bottom of the second elastic element is connected to lower part of the oscillating arm plate;

the second approach wheel is configured on one end of the suspension lateral plate, the track supporting wheel is configured on the top of the suspension lateral plate, the actuation wheel is configured on the other end of the suspension lateral plate and the actuation wheel and the track assembly are mutually engaged.

Preferably, both the first elastic element and second elastic element are shock absorbing spring assemblies and the damping element is a hydraulic damper or an air damper.

Preferably, the oscillating arm plate is configured more than one and the top of multiple oscillating arm plates are spaced and hinged to the suspension lateral plate; the amount of the oscillating arm plate is equivalent to both the amount of the second load-bearing wheel and the amount of the second elastic element.

Preferably, the suspension lateral plate comprises two parallelly configured strip plates which are secured by a bolt; a connecting rod which threads the two strip plates horizontally and is secured to the vehicle body;

the approach plate comprises two parallelly configured right triangle plates; the upper top of the approach plate is connected to the front end of the suspension lateral plate through a rotating shaft, the left top of the approach plate is connected to the first approach wheel through a rotating shaft and the right top of the approach plate is connected to the first load-bearing wheel through a rotating shaft;

the oscillating arm plate comprises two parallelly configured strip plates which are secured through a bolt; the top of the oscillating arm plate is hinged to the suspension lateral plate through a rotating shaft and the bottom of the oscillating arm plate is connected to one second load-bearing wheel through a rotating shaft.

Preferably, the top of the damping element is connected to the front end of the suspension lateral plate through a rotating shaft and the bottom of the damping element is connected to the center of the approach plate through a rotating shaft; the top of the first elastic element is connected to the rotating shaft hinged between the oscillating arm plate and suspension lateral plate that are most close to the first elastic element; the bottom of the first elastic element is connected to the right side of the center of the approach plate through a rotating shaft.

Preferably, the suspension assembly further comprises a tensioning assembly for tensioning the second approach wheel, the second approach wheel is arranged on the front end of the tensioning assembly and the tensioning assembly is connected to the suspension lateral plate.

Preferably, the included angle formed by the oscillating arm plate and the suspension lateral plate is an acute angle; the first elastic element is arranged slantways and the included angle formed by the first elastic element and the suspension lateral plate is an obtuse angle.

Preferably, the first approach wheel, the second approach wheel, the first load-bearing wheel, the second load-bearing wheel and the track supporting wheel are all double-row wheels and the actuation wheel is a single-row wheel.

Preferably, outside the suspension assembly there is configured a protection cover plate which is a strip plate and connected to the suspension lateral plate through a stand.

A track-type mobile platform with damping and buffering property comprising a vehicle body is proposed, wherein the left and right sides of the vehicle body are respectively configured with the above suspension system;

the vehicle body is surrounded and formed by the upper cover plate, the lower bottom plate, the left and right side plates and the front and back side plates; inside the vehicle body there is configured an actuation assembly, a energy assembly and a controlling assembly; the energy assembly is connected to the actuation assembly and the controlling assembly respectively, the controlling assembly is connected to the actuation assembly and the actuation assembly is transmissionally connected to the actuation wheel.

The invention has the following advantages:

The present disclosure configures an approach plate on the front end of the suspension system and then combines it with the first elastic element and the damping element to assemble a load-bearing shock damping module, which can realize the high stability for the mobile platform moving through obstacles while protecting the suspension system at the moment that the gravity center of the platform passes through obstacles and strikes forward, further ensuring the safety of chassis mechanical components and bodywork equipments.

Figure 1:
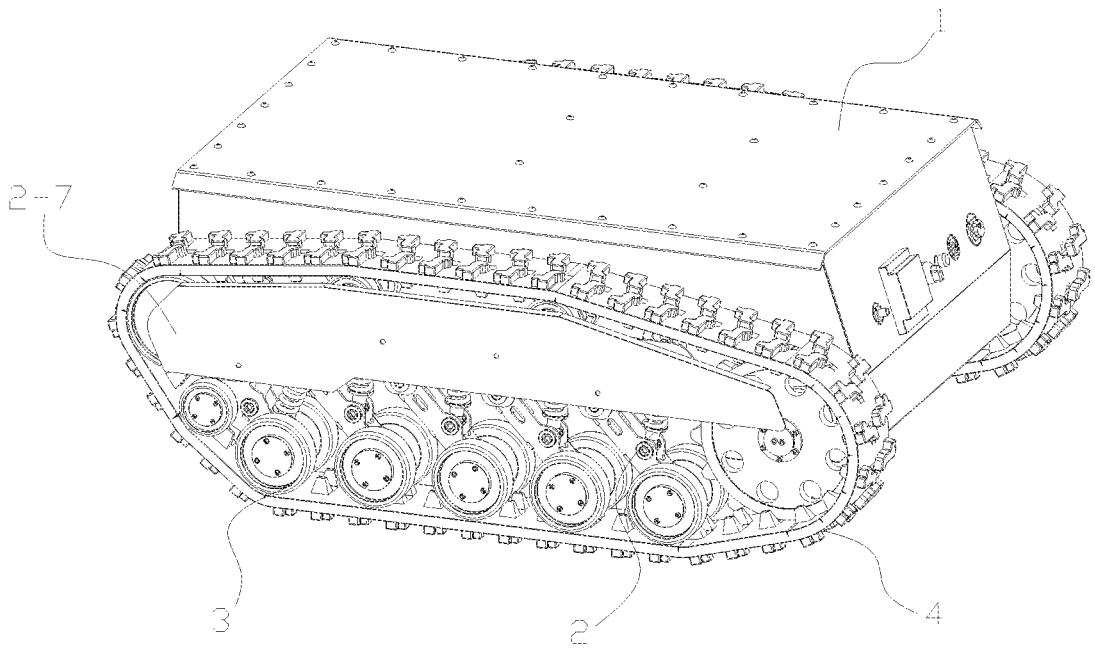
FIG. 1 is the stereo schematic view of the track-type mobile platform of the present disclosure.
Figure 2:
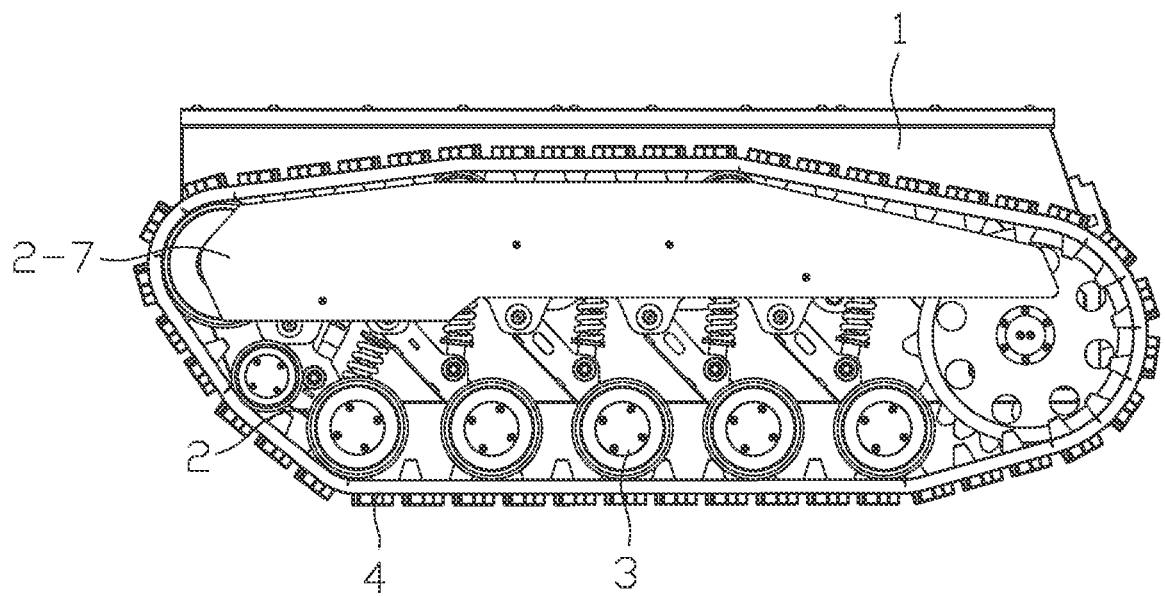
FIG. 2 is the front view schematic view of FIG. 1.
Figure 3:
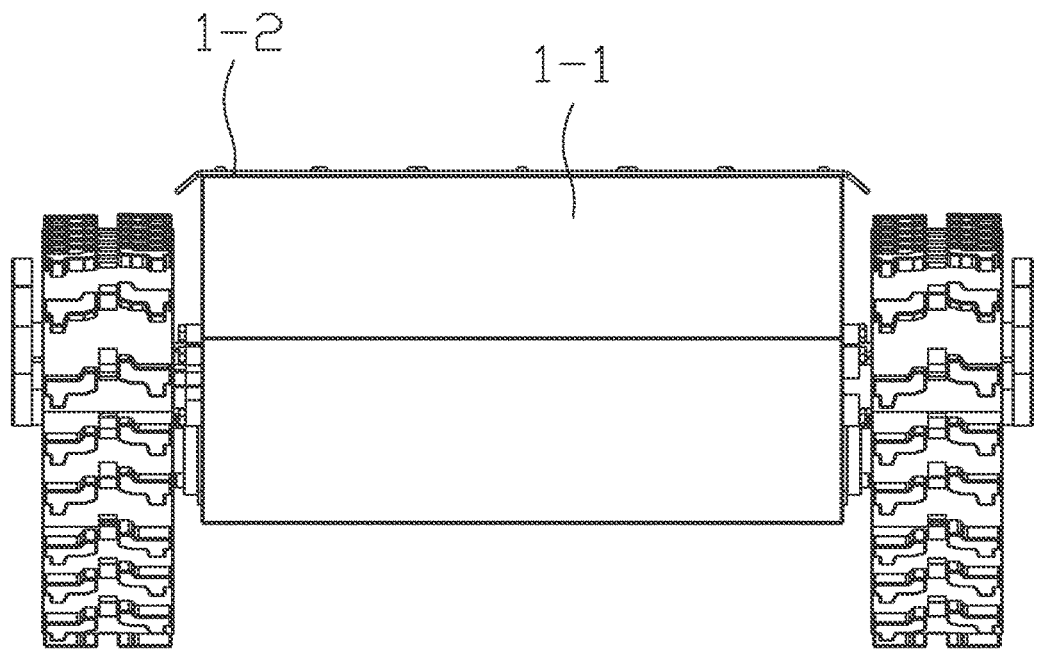
FIG. 3 is the left view schematic view of FIG. 1.
Figure 4:
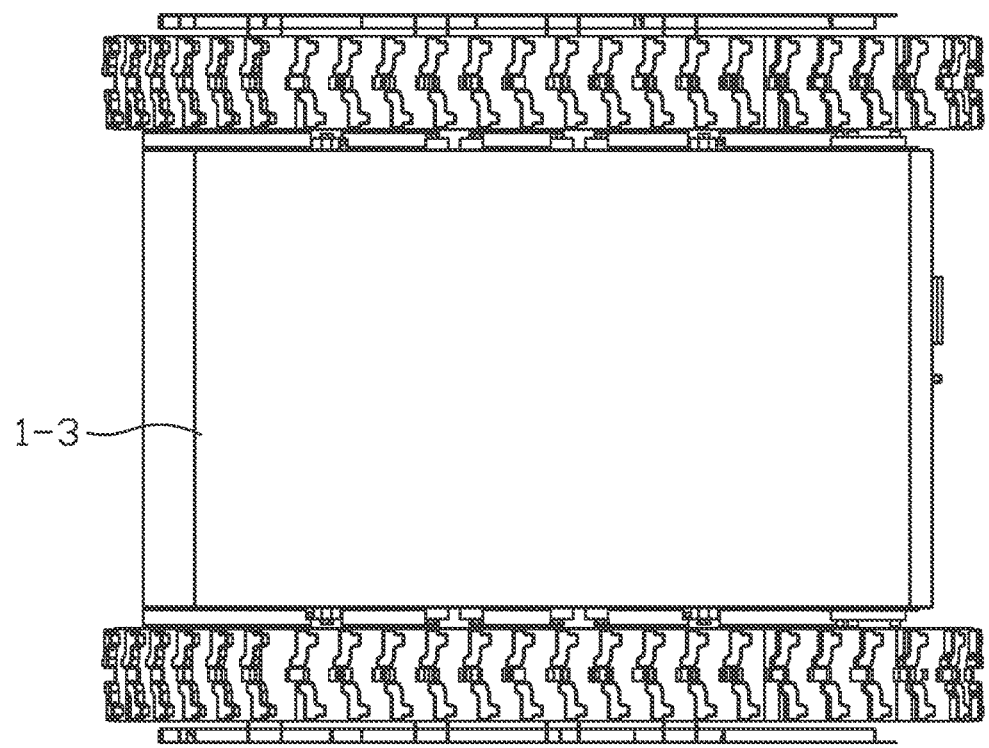
FIG. 4 is the upward view schematic view of FIG. 1.
Figure 5:
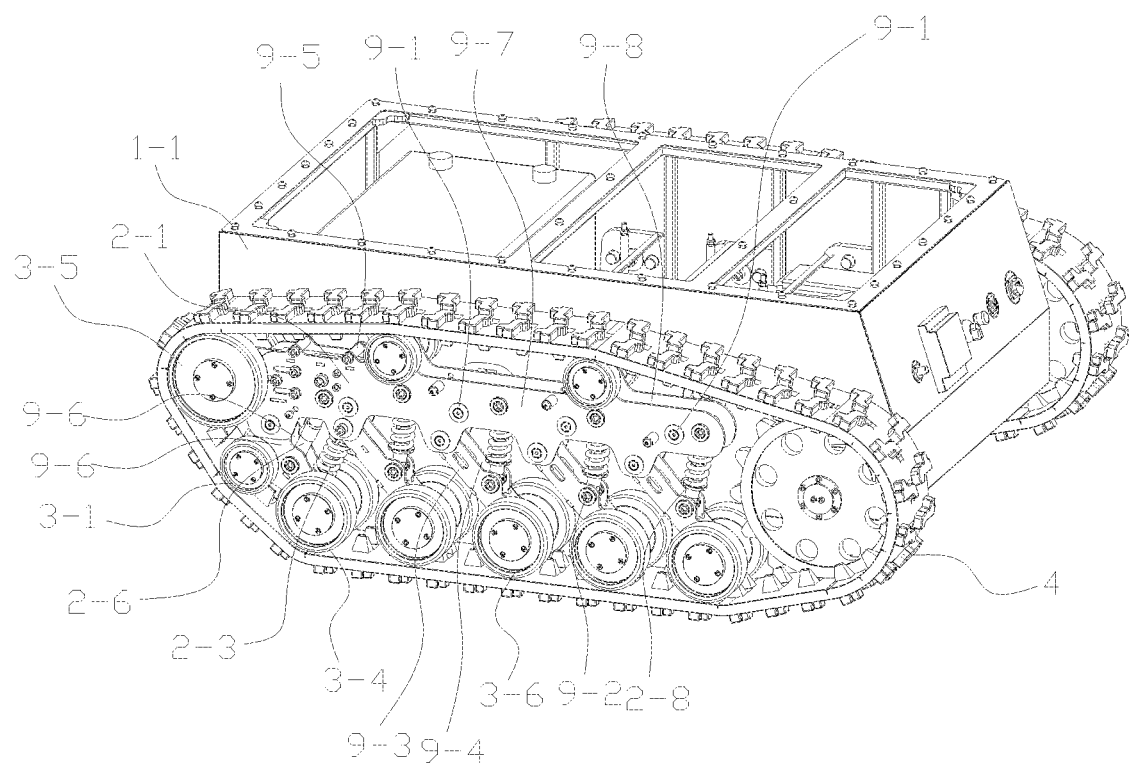
FIG. 5 is the schematic view of the track-type mobile platform of the present disclosure with the cover plate on the upper end and the lateral protection cover plate being removed.
Figure 6:
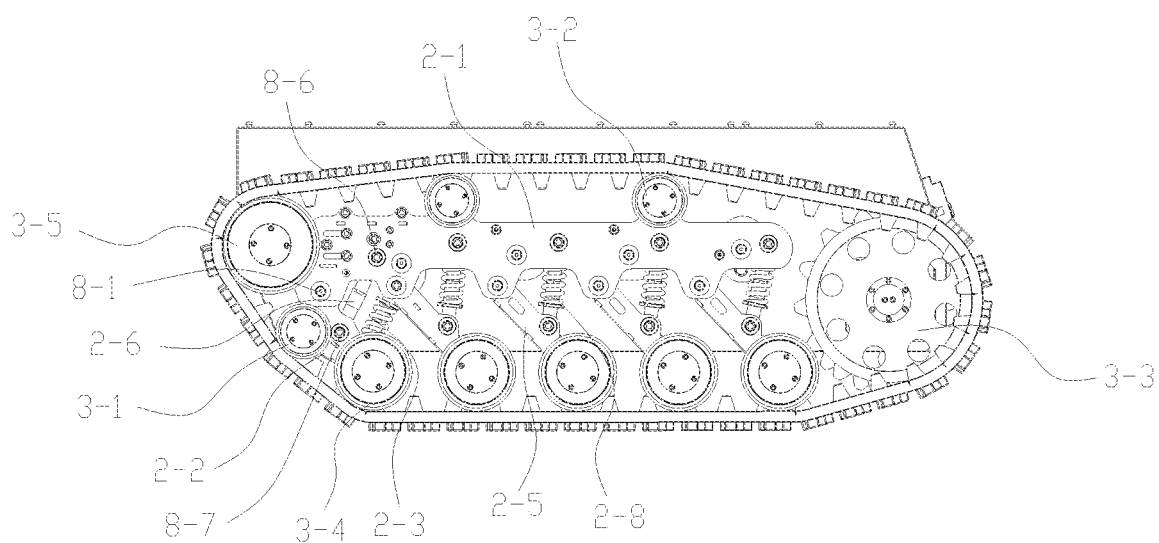
FIG. 6 is the front view schematic view of FIG. 5.
Figure 7:
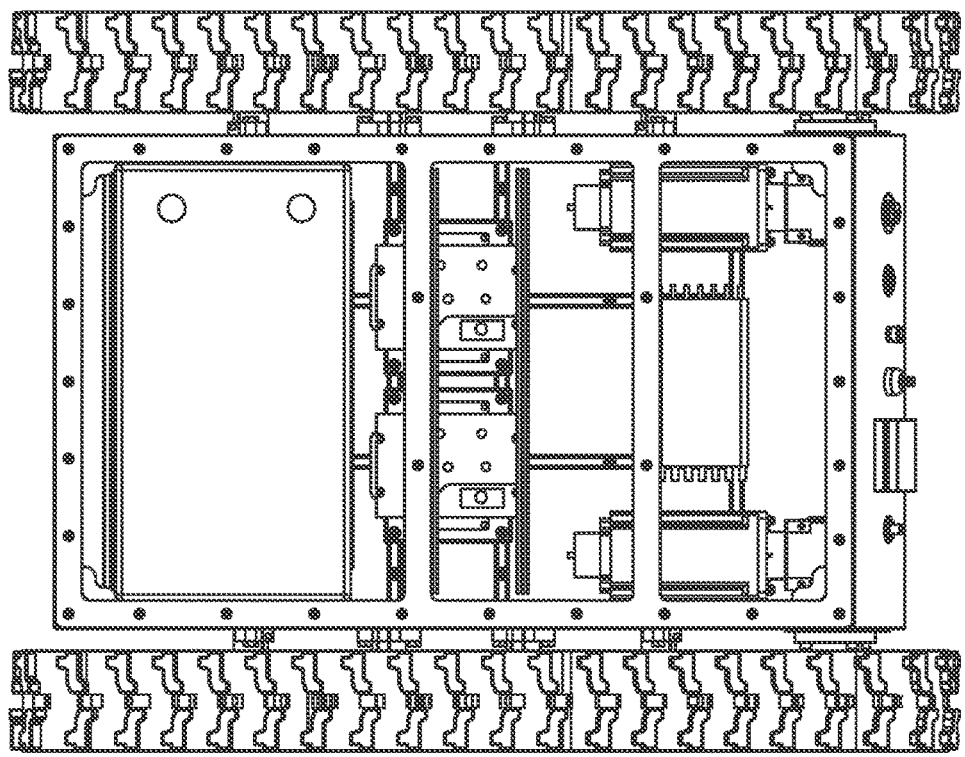
FIG. 7 is the top view schematic view of FIG. 5.
Figure 8:
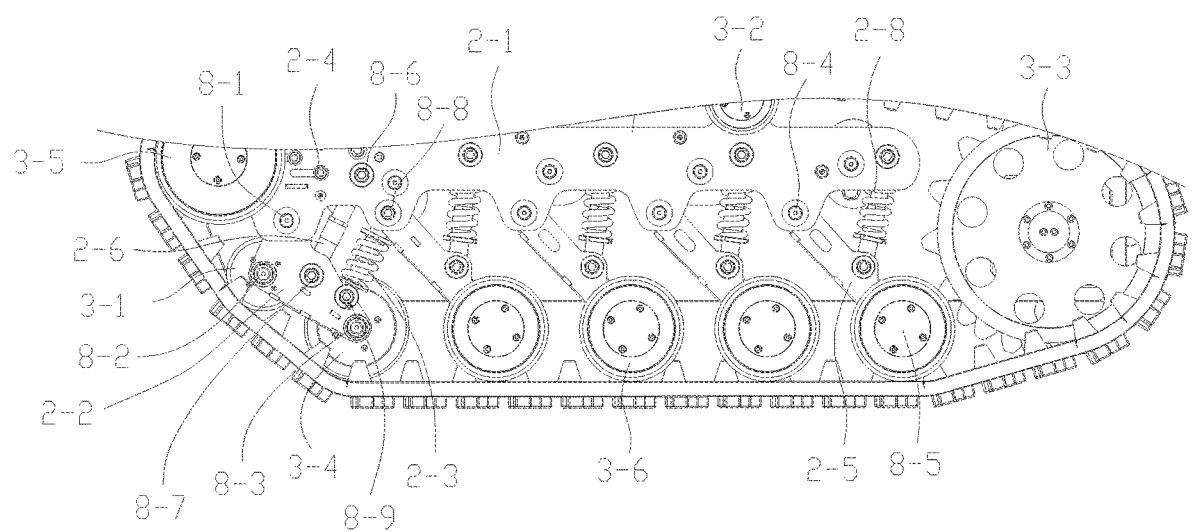
FIG. 8 is the front view schematic principle view of the locally enlarged track-type mobile platform of the present disclosure.
Figure 9:
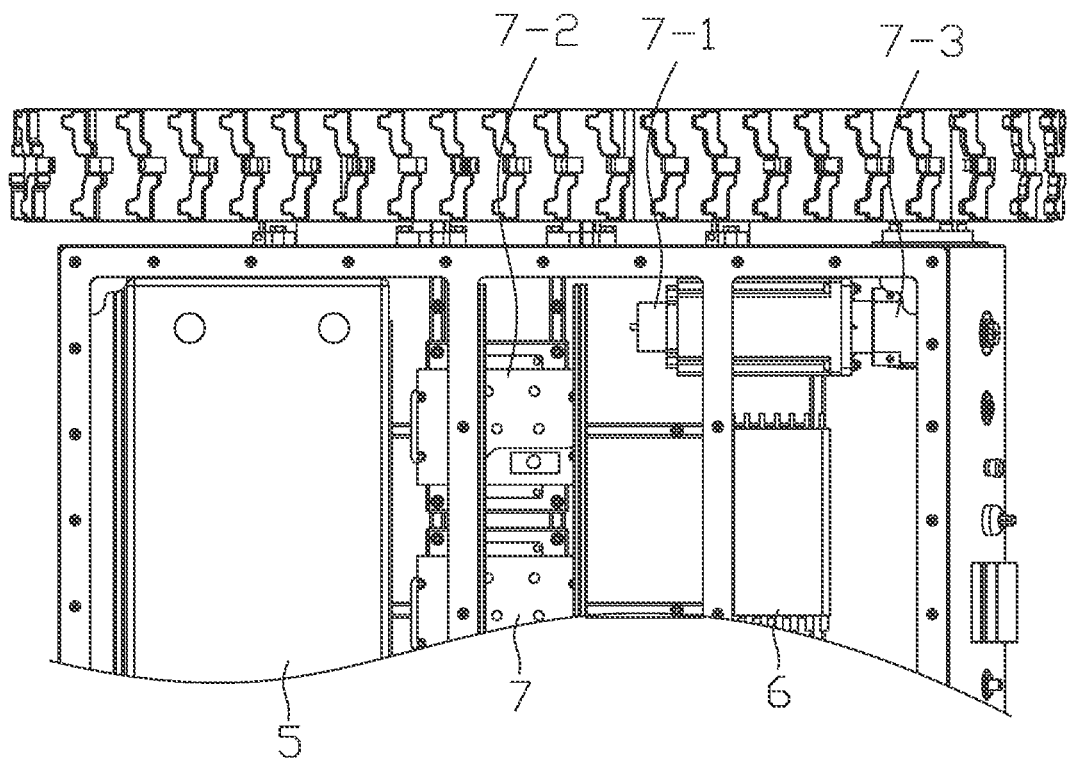
FIG. 9 is the top view schematic principle view of the locally enlarged track-type mobile platform of the present disclosure.

In the figures, 1 represents a vehicle body, 2 represents a suspension assembly, 3 represents a wheel train assembly, 4 represents a track assembly, 5 represents a energy assembly, 6 represents a controlling assembly, 7 represents an actuation assembly, 1-1 represents a side plate, 1-2 represents a cover plate, 1-3 represents a base plate, 2-1 represents a suspension lateral plate, 2-2 represents an approach plate, 2-3 represents a first elastic element, 2-4 represents a tensioning assembly, 2-5 represents a oscillating arm plate, 2-6 represents a damping element, 2-7 represents a protection cover plate, 2-8 represents a second elastic element, 3-1 represents a first approach wheel, 3-2 represents a track supporting wheel, 3-3 represents an actuation wheel, 3-4 represents a first load-bearing wheel, 3-5 represents a second approach wheel, 3-6 represents a second load-bearing wheel, 7-1 represents an actuation motor, 7-2 represents an actuator, 7-3 represents a reduction box, 8-1 represents a first rotating shaft, 8-2 represents a second rotating shaft, 8-3 represents a third rotating shaft, 8-4 represents a forth rotating shaft, 8-5 represents a fifth rotating shaft, 8-6 represents a sixth rotating shaft, 8-7 represents a seventh rotating shaft, 8-8 represents an eighth rotating shaft, 8-8 represents a ninth rotating shaft, 9-1 represents a first bolts, 9-2 represents a second bolt, 9-3 and 9-4 represent two parallelly configured strip plates, 9-5 represents a connecting rod and 9-6 represents two parallelly configured right triangle plates, 9-7 and 9-8 represent parallelly configured long strip plates.

DETAILED DESCRIPTION OF PREFERRED EMBODIMENTS

Hereinafter, "left" and "right" are as to the direction when referring to the drawings, whereas "left" and "right" could also be "right" and "left" respectively if seen from the opposite side of the structures of the invention.

As shown in FIGS. 1-11, the present disclosure provides a suspension system with damping and buffering property, comprising a suspension assembly 2, a wheel train assembly 3 and a track assembly 4. The suspension assembly 2 comprise a suspension lateral plate 2-1, an approach plate 2-2, a first elastic element 2-3, a tensioning assembly 2-4, an oscillating arm plate 2-5, a damping element 2-6 and a second elastic element 2-8. The wheel train assembly 3 comprises a first approach wheel 3-1, a track supporting wheel 3-2, an actuation wheel 3-3, a first load-bearing wheel 3-4, a second approach wheel 3-5 and a second load-bearing wheel 3-6. The track assembly 4 is wrapped on a circular contour formed by the wheel train assembly 3. The suspension lateral plate 2-1 is configured vertically and mounted to a vehicle body. The approach plate 2-2 is in a triangle shape, its upper top is rotationally connected to a front end of the suspension lateral plate 2-1, its left top is connected with the first approach wheel 3-1, its right top is connected with the first load-bearing wheel 3-4. The first elastic element 2-3 and damping element 2-6 are configured between the approach plate and the suspension lateral plate, and the first elastic element 2-3 and damping element 2-6 are arranged parallelly. The oscillating arm plate 2-5 is arranged slantwise, its top is hinged to the suspension lateral plate 2-1, its bottom is connected to the second load-bearing wheel 3-6. The top of the second elastic element 2-8 is connected to the suspension lateral plate 2-1 and the bottom of the second elastic element 2-8 is connected to lower part of the oscillating arm plate 2-5. The second approach wheel 3-5 is configured on the left end of the suspension assembly 2-1 and specifically the second approach wheel 3-5 is configured on the front end of the tensioning assembly 2-4, wherein the tensioning assembly 2-4 is connected to the left end of the suspension lateral plate 2-1, and the tensioning assembly 2-4 can realize the tensioning function on the track assembly 4 by tensioning the second approach wheel 3-5. The track supporting wheel 3-2 is configured on the top of the suspension lateral plate 2-1, the actuation wheel 3-3 is arranged on the right end of the suspension lateral plate, and the actuation wheel 3-3 and the track assembly 4 are mutually engaged.

Both the first elastic element 2-3 and second elastic element 2-8 are shock absorbing spring assemblies and the damping element 2-6 can be a hydraulic damper or an air damper.

The present disclosure configures an approach plate 2-2 on the front end of the suspension system and then combines the first elastic element 2-3 and the damping element 2-6 through the approach plate 2-2 to assemble the load shock damping module together, which can realize the high stability for the mobile platform during its movement through obstacles while protecting the suspension system at the moment that gravity enter of the platform passes through the obstacles and strikes forward, further ensuring the safety of chassis mechanical components and bodywork equipments.

As a further design of the present disclosure, the oscillating arm plate 2-5 is configured more than one and the top of the multiple oscillating arm plates 2-5 are spaced and hinged to the suspension lateral plate 2-1. The amount of the oscillating arm plate 2-5 is equivalent to both the amount of the second load-bearing wheel 3-6 and the amount of the second elastic element 2-8. The amount of the oscillating arm plates 2-5 can be adjusted according to the actual environment and the magnitude of the load on the mobile platform, i.e., the amount of the oscillating arm plates 2-5 can be increased when the shock absorbing effect or the loading intensity needs to be increased, and of course, the amounts of the second load-bearing wheel 3-6 and the second elastic element 2-8 also need to be increased correspondingly.

Further, the suspension lateral plate 2-1 comprises two parallelly configured strip plates which are secured by a first bolt. A connecting rod threads the two strip plates horizontally and is secured to the vehicle body 1. The approach plate 2-2 comprises two parallelly configured right triangle plates; the upper top of the approach plate is connected to the front end of the suspension lateral plate through a first rotating shaft, the left top of the approach plate is connected to the first approach wheel 3-1 through a second rotating shaft and the right top of the approach plate is connected to the first load-bearing wheel 3-4 through a third rotating shaft. The oscillating arm plate 2-5 comprises two parallelly configured strip plates which are secured through a second bolt. The top of the oscillating arm plate is hinged to the suspension lateral plate 2-1 through a forth rotating shaft and the bottom of the oscillating arm plate is connected to one second load-bearing wheel 3-6 through a fifth rotating shaft.

Further, the top of the damping element 2-6 is connected to the front end of the suspension lateral plate 2-1 through a sixth rotating shaft and the bottom of the damping element 2-6 is connected to the center of the approach plate 2-2 through a seventh rotating shaft; the top of the first elastic element 2-3 is connected to an eighth rotating shaft hinged between the oscillating arm plate and the suspension lateral plate that are most close to the first elastic element. The bottom of the first elastic element 2-3 is connected to the right side of the center of the approach plate 2-2 through a ninth rotating shaft. The included angle formed by the oscillating arm plate 2-5 and the suspension lateral plate 2-1 is an acute angle. The first elastic element 2-3 is arranged slantways and the included angle formed by the first elastic element 2-3 and the suspension lateral plate 3-5 is an obtuse angle.

The rotating shafts configured between the above two strip plates of the suspension lateral plate, between two right triangle plates of the approach plate and between two strip plates of the oscillating arm plate all laterally arranged, which can be exemplified that the rotating shaft between two strip plates of the suspension lateral plate is vertical to both the two strip plates. All ends of the first elastic element, the second elastic element and the damping element are connected to the rotating shafts of the corresponding locations. Of course, part of the above rotating shafts can also be replaced by members such as a pin roll to realize the corresponding function.

The above first approach wheel 3-1, the second approach wheel 3-5, the first load-bearing wheel 3-4, the second load-bearing wheel 3-6 and the track supporting wheel 3-2 are all double-row wheels and the actuation wheel 3-3 is a single-row wheel.

Further, outside the suspension assembly 2 there is configured a protection cover plate 2-7 which is a vertically arranged strip plate and connected to the suspension lateral plate 2-1 through a stand. The protection cover plate 2-7 can protect the members in the suspension assembly 2.

The present disclosure also provides a track-type mobile platform with damping and buffering property comprising a vehicle body 1, wherein the left and right sides of the vehicle body 1 are respectively configured with a suspension system with the above-mentioned structure. The vehicle body 1 is surrounded and formed by the upper cover plate 1-2, the lower bottom plate 1-3, the left and right side plates 1-1, and the front and back side plates 1-1. Inside the vehicle body 1 there is configured an actuation assembly 7, a energy assembly 5 and a controlling assembly 6; wherein the energy assembly 5 is respectively connected to the actuation assembly 7 and the controlling assembly 6, the controlling assembly 6 is connected to the actuation assembly 7, and the actuation assembly 7 is transmissionally connected to the actuation wheel 3-3.

Now the present disclosure is further illustrated by the detailed description of each component and the explanation of relevant principles, respectively.

A track-type mobile platform with damping and buffering property, whose mechanical and electrical structural compositions at least comprise a vehicle body 1, a suspension assembly 2, a wheel train assembly 3, a track assembly 4, a energy assembly 5, a controlling assembly 6 and an actuation assembly 7.

The vehicle body 1 is a rectangle body for realizing the support of the entire mobile platform and its inside is hollow. The vehicle body 1 is surrounded and formed by the rectangle side plates 1-1 configured on the left and right sides and the front and rear sides, a cover plate 1-2 configured on the upper end, the bottom plate 1-3 configured on the lower end, multiple side panels 1-1, the cover plate 1-2 and the bottom plate 1-3. The actuation assembly 7, the energy assembly 5, and the controlling assembly 6 are configured inside the vehicle body 1.

The suspension assembly 2, the wheel train assembly 3, and the track assembly 4 constitute the movable suspension system on one side, and each track-type mobile platform is configured with one movable suspension system on each of the left and right sides respectively. The suspension assembly 2, the wheel train assembly 3 and the track assembly 4 in any one movable suspension system have the following structural features:

The suspension assembly 2 enable the vehicle body 1 to achieve the shock absorption, shock filtering, and climbing and obstacle crossing function, and it at least comprises a suspension lateral plate 2-1, an approach plate 2-2, a first elastic element 2-3, a tensioning assembly 2-4, an oscillating arm plate 2-5, a damping element 2-6, a protection cover 2-7 and a second elastic element 2-8.

The suspension lateral plate 2-1 is two vertically configured linear sheet structures, wherein the two sheets are secured through a bolt. The suspension lateral plate 2-1 is configured with a through hole along its horizontal direction and is secured to the side plate 1-1 in the vehicle body 1 through a connection rod.

The approach plates 2-2 are two parallelly configured right triangular plates, which are integrated as one plate, and its upper top is connected to the front end of the suspension lateral plate 2-1 through a rotating shaft, its left top is connected to the first approach wheel 3-1 through a rotating shaft and its right top is connected to the first load-bearing wheel 3-4 through a rotating shaft.

Both the first elastic element 2-3 and the second elastic element 2-8 have a certain elasticity and are arranged slantways. The amount of first elastic element 2-3 is 1, and the amount of second elastic element(s) 2-8 is M, wherein M≥1. The upper end of the first elastic element 2-3 is configured on the front side of the suspension lateral plate 2-1, on the rotating shaft where the first oscillating arm plate 2-5 counting from the left side is hinged with the suspension lateral plate 2-1, and the lower end of the first elastic element 2-3 is hinged with right side of the center of the approach plate 2-2 through a rotating shaft.

The tensioning assembly 2-4 achieves tensioning of the second approach wheel 3-5, thereby achieving tensioning function of the track assembly 4. The second approach wheel 3-5 is configured on the front end of the tensioning assembly 2-4, and the rear end of the tensioning assembly 2-4 is configured on the most front end of the suspension lateral plate 2-1.

The oscillating arm plate 2-5 is two parallelly configured strip plates, and the amount thereof is N, wherein N≥1. The two strip plates in the oscillating arm plate 2-5 are secured by a bolt. The lower end of the oscillating arm plate 2-5 is connected to the second load-bearing wheel 3-6 through the rotating shaft, and the upper end thereof is hinged to the suspension lateral plate 2-1 through the rotating shaft.

Further, when the amount of the oscillating arm plate 2-5 N>1, the top of each oscillating arm plate 2-5 is hinged to the suspension lateral plate 2-1 at an uniform interval through a rotating shaft. The included angle of the oscillating arm 2-5 and the suspension lateral plate 2-1 is an acute angle. The amount N of the swing arm 2-5 can be adjusted according to the actual environment and the magnitude of the load on the mobile platform. When the shock absorbing effect of the mobile platform or the loading intensity need to be increased, the amount N can be increased.

The damping element 2-6 is used to provide resistance to the movement and consume movement energy, and they are configured in parallel with the first elastic element 2-3. The damping element 2-6 is of a certain distance to the first elastic element 2-3. Similarly, the upper end of the damping element 2-6 is configured on the suspension lateral plate 2-1, and the lower ends thereof are hinged to the center of the approach plate 2-2 through a rotating shaft.

The protection cover 2-7 is a linear sheet, and is configured on the suspension lateral plate 2-1 through a stand to protect the suspension assembly 2.

Steps for the suspension assembly 2 to realize the load-bearing function are as follows: when the vehicle body 1 is under load, the gravity passes through the side plate 1-1 in the vehicle body 1→the suspension lateral plate 2-1→the second elastic member 2-8→the oscillating arm plate 2-5→the second load-bearing wheel 3-6→ground, thereby generating a supporting effect.

Further, steps for the suspension assembly 2 to realize the shock absorbing function are as follows: when there is an obstacle on the ground or the road is bumpy, shock with large frequency and small amplitude successively passes through the second load-bearing wheel 3-6→the oscillating arm plate 2-5→the second elastic element 2-8→the suspension lateral plate 2-1 and the shock is filtered after passing through the second elastic element 2-8; the shock with small frequency and large amplitude is vibrated for several times and thus consumed after passing through the second elastic element 2-8, which also produces shock buffering effect to the vehicle body 1.

Figure 10:
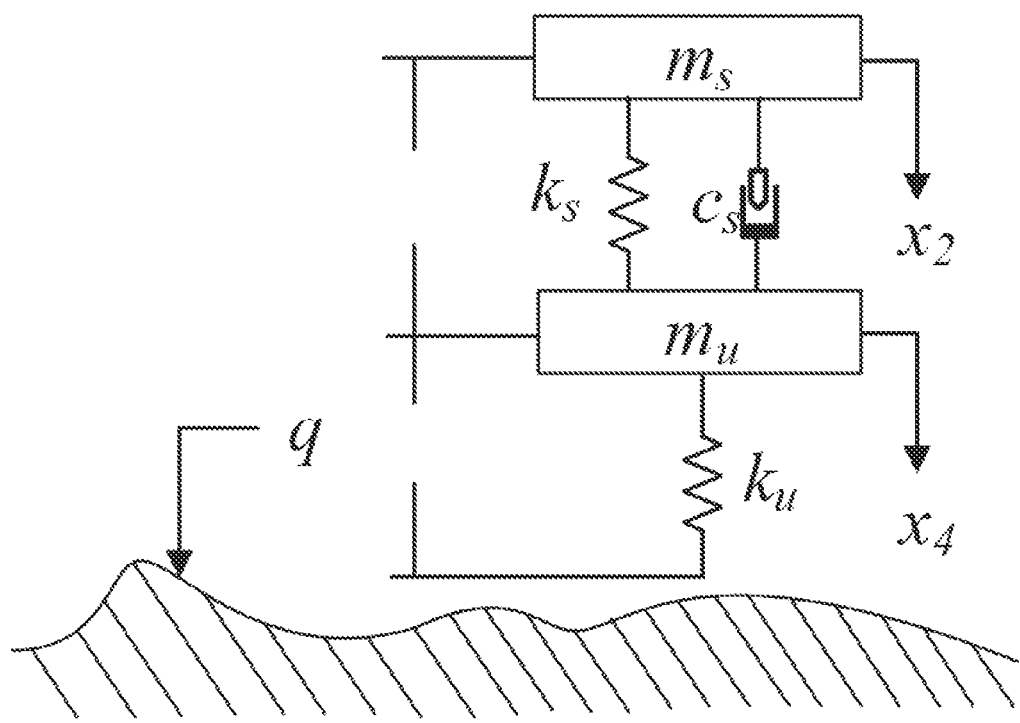
FIG. 10 shows the suspension model when the damping element does not function during the movement on smooth pavement.
Figure 11:
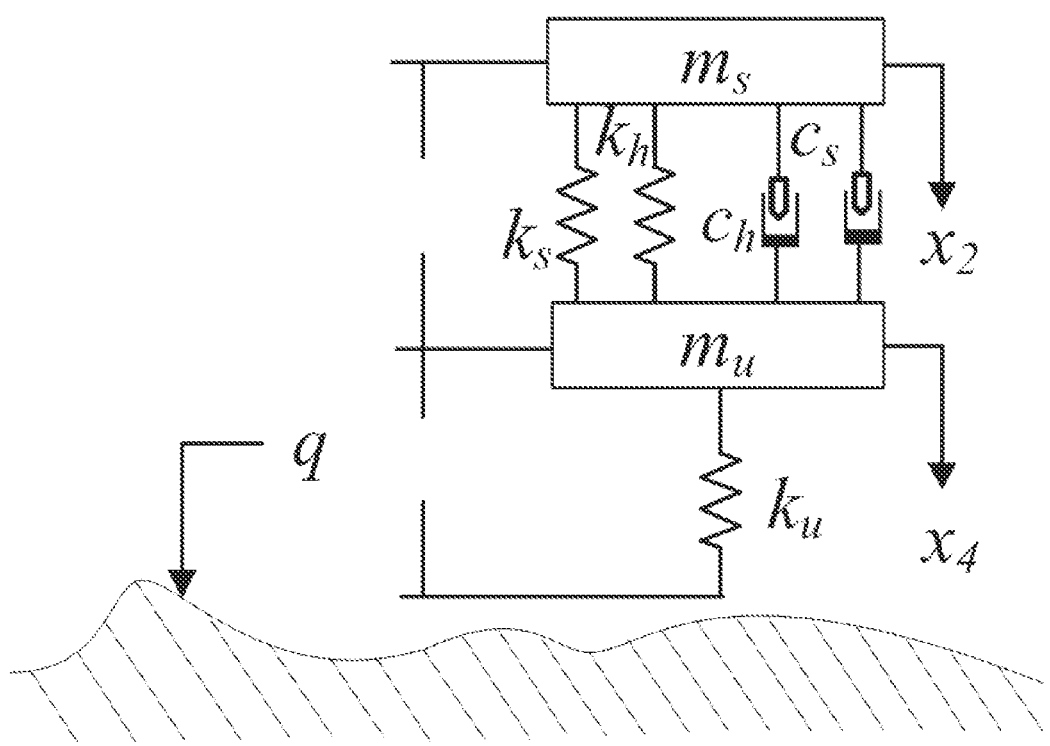
FIG. 11 shows the suspension model when the damping element functions during the movement through obstacles.

The track-type mobile platform with damping and buffering property in the present disclosure realizes the safety of the suspension assembly, the shock absorbing function and the stability function of the vehicle body by configuring the approach plate 2-2 in combination with the first elastic plate 2-3 and the damping element 2-6. The implementation mechanisms are:

when the track-type mobile platform moves in a flat pavement or the first approach wheel 3-1 does not touch the obstacle or is not impacted, the damping element 2-6 does not function and only the first elastic element 2-3 functions, the loading and shock absorbing module formed by the approach plate 2-2, the first elastic element 2-3 and the damping element 2-6 can be simplified as FIG. 10, wherein $m_s$ is the weight of the load and the vehicle body, $m_u$ is the unsprung mass, $k_s$ is the rigidity of the first elastic element 2-3, $k_u$ is the rigidity of the first load-bearing wheel 3-4, $c_s$ is the damping coefficient of the first elastic element 2-3, $x_2$ is the displacement caused by the load and the vehicle body, $x_4$ is the displacement caused by the unsprung mass, and q is the displacement caused by pavement incentives.

At the moment that there is a bumpy obstacle ahead, and the first approach wheel 3-1 on the front of the vehicle body hits the obstacle or the moment that the gravity center of the vehicle body passes through the obstacle and impacts forward on the pavement, the first elastic element 2-3 and the damping element 2-6 function in coordination and function to buffer the shock. At this time, the rigidity of the suspension system is equivalent to rigidity of the first elastic element 2-3 and the damping element 2-6 in parallel, i.e. the paralleled rigidity $k_{sh}=k_s+k_h$, wherein $k_h$ is the rigidity of the damping element 2-6. At this time, the total damping of the module assembly formed by the approach plate 2-2 in combination with the first elastic element 2-3 and the damping element 2-6 is also equivalent to the total damping of the first elastic element 2-3 and the damping element 2-6 in parallel, i.e. the paralleled damping $c=c_s+c_h$. At this time, the load-bearing and shock absorbing module formed by the approach plate 2-2, the first elastic element 2-3 and the damping element 2-6 can be simplified as FIG. 11, wherein $m_s$ is the weight of the load and the vehicle body, $m_u$ is the unspring weight, $k_s$ is the rigidity of the first elastic element 2-3, $k_h$ is the rigidity of the damping element 2-6, $k_u$ is the rigidity of the load-bearing wheel, $c_s$ is the damping coefficient of the first elastic element 2-3, $c_h$ is the damping coefficient of the damping element 2-6, $x_2$ is the displacement caused by the load and the vehicle body, $x_4$ is the displacement caused by the unsprung mass, and q is the displacement caused by pavement incentives.

It can be seen from the above comparison that the damping element 2-6 does not function and only the first elastic element 2-3 functions on a flat pavement so that the entire suspension is flexible; when shocked by the obstacle, the suspension system combines the first elastic element 2-3 and the damping element 2-6 through a approach plate 2-2 to form a module assembly. The damping element functions to buffer so as to prevent the approach plate and the platform assemblies behind the approach plate from major impacts resulted on the suspension system due to outside obstacles, and further provide the front end of the platform with a slight deform when subjected to outside impact. Besides, when the gravity center of the platform passes through the obstacle, the suspension system can move stably as a whole due to its large rigidity.

The wheel assembly 3 comprises a first approach wheel 3-1, a track supporting wheel 3-2, an actuation wheel 3-3, a first load-bearing wheel 3-4, a second approach wheel 3-5 and a second load-bearing wheel 3-6.

The first approach wheel 3-1 is a double-row wheel and is configured on the left top of the approach plate 2-2.

The second approach wheel 3-5 is a double-row wheel and is interconnected through a rotating shaft at its middle part, and it is configured on the front end of the tensioning assembly 2-4.

The track supporting wheel 3-2 is a double-row wheel with a diameter slightly smaller than that of the second approach wheel 3-5, which is arranged by 2 sets and configured on the front and rear sides where the suspension lateral plate 2-1 is close to the center, to achieve the dragging function on the track assembly 4.

The actuation wheel 3-3 is a single-row wheel with a biggest diameter among the wheels and its circumferential circle is configured with teeth to engage with the track assembly 4, and it is configured behind the side plate 1-1 through the actuation and forces the track assembly 4 to rotate through its rotation.

The first load-bearing wheel 3-4 and the second load-bearing wheel 3-6 are also a double-row wheel. The second load-bearing wheel 3-6 is configured at the bottom of the oscillating arm plate 2-5 through the rotating shaft and the amount of second load-bearing wheel 3-6 is consistent with the amount M of the second elastic element 2-8.

The track assembly 4 is an annular body formed by connecting strip flat rubbers in a manner of head to tail, which is wrapped on the annular contour formed by the wheel train assembly 3.

The energy assembly 5 is a battery and is electrically connected to the actuation assembly 7 and the controlling assembly 6, to provide power for the entire set of the actuation assembly 7 and the controlling assembly 6.

The controlling assembly 6 is a controller to control the operation of the actuation assembly 7 and further control the movement of the vehicle body 1, which is electrically connected to the actuation assembly 7 and the energy assembly 5 respectively.

The actuation assembly 7 comprises an actuation motor 7-1, an actuator 7-2 and a reduction box 7-3. The actuation motor 7-1, the actuator 7-2 and the reduction box 7-3 are all arranged as 2 sets on the left and right sides respectively, all of which are configured in the cavity of the vehicle body 1. The layout on any side is that the actuation motor 7-1 is configured longitudinally and the rotating shaft is connected to the reduction box 7-3. The output shaft of the reduction box 7-3 is secured to the actuation shaft and the actuation shaft is secured to the actuation wheel 3-3. In the electrical composition, the actuator 7-2 is also connected to the actuation motor 7-1. The working principle of the actuation assembly 7 is that the actuator 7-2 is controlled to actuate the actuation motor 7-1 to rotate and lead the reduction box 7-3 to slow down and increase the torque, thereby driving the actuation wheel 3-3 to rotate and realizing driving the movement of the vehicle body 1.

The differential turning or the insitu rotation movement of the vehicle body 1 is actuated by actuating the actuation motors 7-1 on both sides for a differential or transverse rotation.

Further, when the rotational speed of the selected actuation motor 7-1 is small enough while its torque is large enough, the actuation motor 7-1 can be directly connected to the actuation wheel 3-3. When the actuation motor 7-1 directly actuates the actuation wheel 3-3, generally, a horizontal layout is adopted.

The actuator 7-2 can also be arranged as 1 set, inside which two sets of actuation circuits can be arranged, which can realize the simultaneous actuating function on the actuation motors 7-1 on the left and right sides.

What are not mentioned in the above-mentioned methods can be realized by adopting or referring to the prior art.

It should be noted that any equivalent alternations or significant variants of the present disclosure under the teachings of this specification should be within the protection scope of the present disclosure.

What is claimed is:

1. A suspension system with damping and buffering properties, comprising a suspension assembly, a wheel train assembly and a track assembly, wherein, the suspension assembly comprises a suspension lateral plate, an approach plate, a first elastic element, a second elastic element, a plurality of oscillating arm plates, and a damping element; the wheel train assembly comprises a first approach wheel, a second approach wheel, a first load-bearing wheel, a second load-bearing wheel, a track supporting wheel and an actuation wheel; the track assembly is wrapped in a circular contour formed by the wheel train assembly;

the suspension lateral plate is configured vertically and mounted to a vehicle body; the approach plate is in a triangle shape, the upper top of the approach plate is rotationally connected to a front end of the suspension lateral plate, a side of top of the approach plate is configured with the first approach wheel, the other side of the top of the approach plate is configured with the first load-bearing wheel; the first elastic element and the damping element are configured between the approach plate and the suspension lateral plate and are arranged parallelly;

the oscillating arm plate is arranged slantwise, and its top is hinged to the suspension lateral plate, its bottom is connected to the second load-bearing wheel; the top of the second elastic element is connected to the suspension lateral plate and the bottom of the second elastic element is connected to the lower part of the oscillating arm plate;

the second approach wheel is configured on one end of the suspension lateral plate, the track supporting wheel is configured on the top of the suspension lateral plate, the actuation wheel is configured on the other end of the suspension lateral plate and the actuation wheel and the track assembly are mutually engaged;

both the first elastic element and second elastic element are shock absorbing spring assemblies and the damping element is a hydraulic damper or an air damper;

the suspension lateral plate comprises two parallelly configured long strip plates which are secured by a first bolt; a connecting rod which threads the two strip plates horizontally and is secured to the vehicle body;

the approach plate comprises two parallelly configured right triangle plates; the upper top of the approach plate is connected to the front end of the suspension lateral plate through a first rotating shaft, a side of top of the approach plate is connected to the first approach wheel through a second rotating shaft and the other side of the top of the approach plate is connected to the first load-bearing wheel through a third rotating shaft, the oscillating arm plate comprises two parallelly configured strip plates which are secured through a second bolt; the top of the oscillating arm plate is hinged to the suspension lateral plate through a forth rotating shaft and the bottom of the oscillating arm plate is connected to the second load-bearing wheel through a fifth rotating shaft;

the top of the damping element is connected to the front end of the suspension lateral plate through a sixth rotating shaft and the bottom of the damping element is connected to the center of the approach plate through a seventh rotating shaft; the top of the first elastic element is connected to the eighth rotating shaft hinged between the oscillating arm plate and suspension lateral plate that are most close to the first elastic element; the bottom of the first elastic element is connected to the right side of the center of the approach plate through a ninth rotating shaft.

2. The suspension system with damping and buffering properties according to claim 1, wherein the plurality of oscillating arm plates are hinged on the suspension lateral plate and are spaced with each other; the amount of oscillating arm plates of the plurality of oscillating arm plates is the same with either the amount of the second load-bearing wheel or the amount of the second elastic element.

3. The suspension system with damping and buffering properties according to claim 1, wherein the suspension assembly further comprises a tensioning assembly for tensioning the second approach wheel which is arranged on the front end of the tensioning assembly and the tensioning assembly is connected to the suspension lateral plate.

4. The suspension system with damping and buffering properties according to claim 1, wherein the included angle formed by the oscillating arm plate and the suspension lateral plate is an acute angle; the first elastic element is arranged slantways and the included angle formed by the first elastic element and the suspension lateral plate is an obtuse angle.

5. The suspension system with damping and buffering properties according to claim 1, wherein the first approach wheel, the second approach wheel, the first load-bearing wheel, the second load-bearing wheel and the track supporting wheel are all double-row wheels and the actuation wheel is a single-row wheel.

6. The suspension system with damping and buffering properties according to claim 1, wherein the outside of the suspension assembly is configured with a protection cover plate which is a strip plate and connected to the suspension lateral plate through a stand.

7. A track-type mobile platform with damping and buffering properties comprising a vehicle body, left and right sides of the vehicle body are respectively configured with a suspension system according to claim 1;

the vehicle body is surrounded and formed by an upper cover plate, a lower bottom plate, a left side plate and a right side plate, and a front side plate and a back side plate; inside the vehicle body there is configured an actuation assembly, a energy assembly and a controlling assembly; the energy assembly is respectively connected to the actuation assembly and the controlling assembly, the controlling assembly is connected to the actuation assembly and the actuation assembly is transmissionally connected to the actuation wheel.

* * * * *